F. CONRAD.
STARTING MECHANISM FOR AUTOMOBILES.
APPLICATION FILED MAY 11, 1914.

1,175,342.

Patented Mar. 14, 1916.

WITNESSES:
P. J. Ridge.
J. R. Langley.

INVENTOR
Frank Conrad
BY
Wesley G. Carr
ATTORNEY

UNITED STATES PATENT OFFICE.

FRANK CONRAD, OF PITTSBURGH, PENNSYLVANIA, ASSIGNOR TO WESTINGHOUSE ELECTRIC AND MANUFACTURING COMPANY, A CORPORATION OF PENNSYLVANIA.

STARTING MECHANISM FOR AUTOMOBILES.

1,175,342.

Specification of Letters Patent.  Patented Mar. 14, 1916.

Application filed May 11, 1914. Serial No. 837,718.

*To all whom it may concern:*

Be it known that I, FRANK CONRAD, a citizen of the United States, and a resident of Pittsburgh, in the county of Allegheny and State of Pennsylvania, have invented a new and useful Improvement in Starting Mechanism for Automobiles, of which the following is a specification.

My invention relates to starting mechanisms for automobiles and particularly to such mechanisms as embody motors and gear mechanisms for operatively connecting them to internal combustion engines.

My invention has for its object to provide a mechanism of the character indicated above which operates to automatically control the operative connection of a motor to the engine shaft of an automobile or other motor vehicle.

Figure 1:
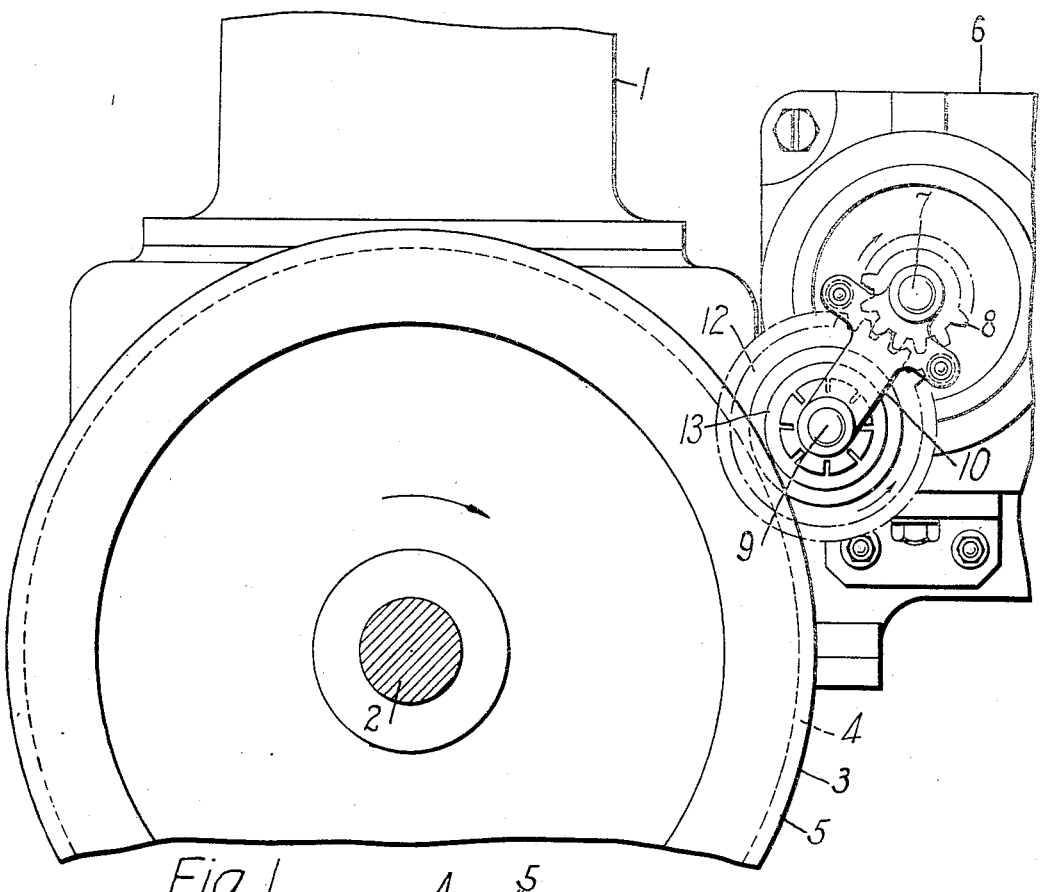
Figure 2:
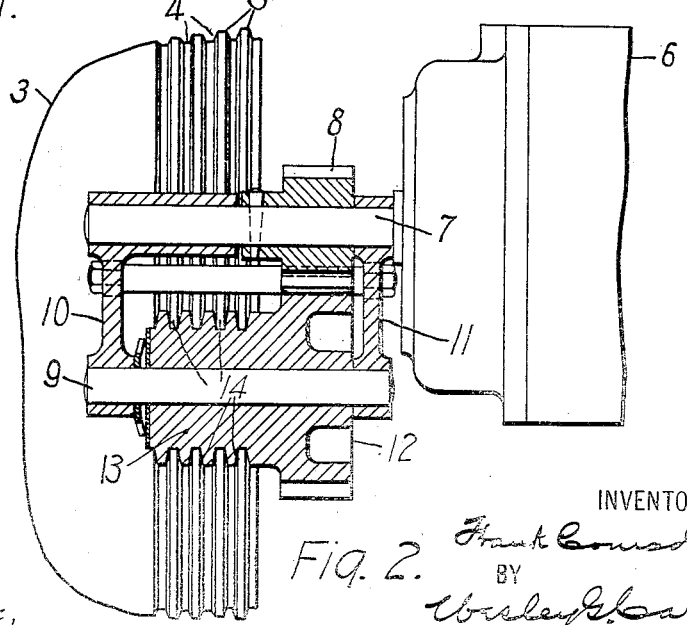

In the accompanying drawings, Figure 1 is an end view, in elevation, of an internal combustion engine with my invention attached thereto, parts being broken away. Fig. 2 is a side view, partially in elevation and partially in section, of the mechanism shown in Fig. 1.

An internal combustion engine 1, only a portion of which is shown, comprises a shaft 2 and a fly wheel 3 on the shaft that is provided with annular grooves 4 and projections 5 upon its outer periphery. A motor 6, which may be, for example, an electric motor, is mounted upon any suitable stationary portion of the engine or the frame of the vehicle, and is provided with an armature shaft 7 upon which is mounted a pinion 8. A counter shaft 9 is supported by arms 10 and 11 which are rotatably mounted on the armature shaft 7. A gear wheel 12, which is rotatably mounted on the shaft 9 and meshes with the pinion 8, is connected to a friction wheel 13 that is provided with annular grooves 14 to receive the corresponding projections 5 on the fly wheel 3. The fly wheel 3 and the friction wheel 13 may, if it is so desired, be provided with smooth surfaces instead of the grooved surfaces illustrated. Normally, the shaft 9 and its connected parts are caused, by force of gravity, to occupy a position directly below the armature shaft 7. When it is desired to start the engine, energy is supplied to the motor 6 through any suitable connections (not shown). The initial movement of the pinion 8, which rotates in a clockwise direction, as indicated by the arrow, Fig. 1, operates to revolve the gear wheel 12, the friction wheel 13 and the shaft 9 about the armature shaft as a pivot, and thereby effect engagement of the friction wheel 13 with the fly wheel 3. The engagement of the friction wheel 13 with the fly wheel 3 will be maintained by the component of the driving torque of the motor with a force that is sufficient to operatively connect the motor 6 to the fly wheel 3. It will be noted that the angle formed by the lines joining the axis of the shaft 7 with the axes of the shafts 2 and 9, respectively, is very small so that a comparatively small force normal to the line joining the axes of the shafts 7 and 9 will cause the friction wheel 13 to exert a considerable pressure on the fly wheel 3. This engagement will be maintained as long as the motor is the driving member.

When the engine starts under its own power, the speed of the fly wheel will exceed that of the friction wheel 13 and the component of force which formerly maintained the engagement between these two members is reversed in direction and the friction wheel 13 is automatically returned to its normal position. The supply circuit of the motor is then opened by the operator.

It will be noted that I provide a mechanism by means of which a motor is automatically connected to the engine shaft of an automobile upon the starting of the motor, and is automatically disconnected therefrom when the engine starts under its own power. The mechanism above described possesses the advantage that it is unnecessary to effect the meshing of gear wheels and, therefore, the inadvertent connection of the motor to the fly wheel, when the latter is rotating, cannot injure the connecting mechanism.

It will be understood that many modifications may occur to those skilled in the art to which my invention appertains and that such changes may be made, without departing from the spirit of my invention, as fall within the scope of the appended claims.

I claim as my invention:

1. In a starting mechanism, the combination with an engine shaft, and a wheel thereon, of a motor having a shaft, a second wheel geared to the motor shaft and secured to said motor shaft for bodily movement relatively thereto, said second wheel being actuated by the torque of the motor to engage the other wheel.

2. In a starting mechanism, the combination with an engine shaft and a wheel thereon, of a motor having a shaft, a friction wheel operatively connected to said motor and revolubly secured to said shaft, said friction wheel being actuated by the torque of said motor to engage the other wheel.

3. In a starting mechanism, the combination with a shaft and a wheel thereon, of a motor having a shaft, a friction wheel operatively connected to the motor shaft and revolubly suspended therefrom, whereby the torque of said motor actuates said friction wheel to engage the other wheel.

In testimony whereof, I have hereunto subscribed my name this 27th day of April, 1914.

FRANK CONRAD.

Witnesses:
W. L. WRIGHT,
B. B. HINES.